Jan. 13, 1959　　　R. C. SURRATT　　　2,868,305
POWER TILLER FOR ORCHARDS
Filed Feb. 13, 1957　　　　　　　　　　　　　2 Sheets-Sheet 1
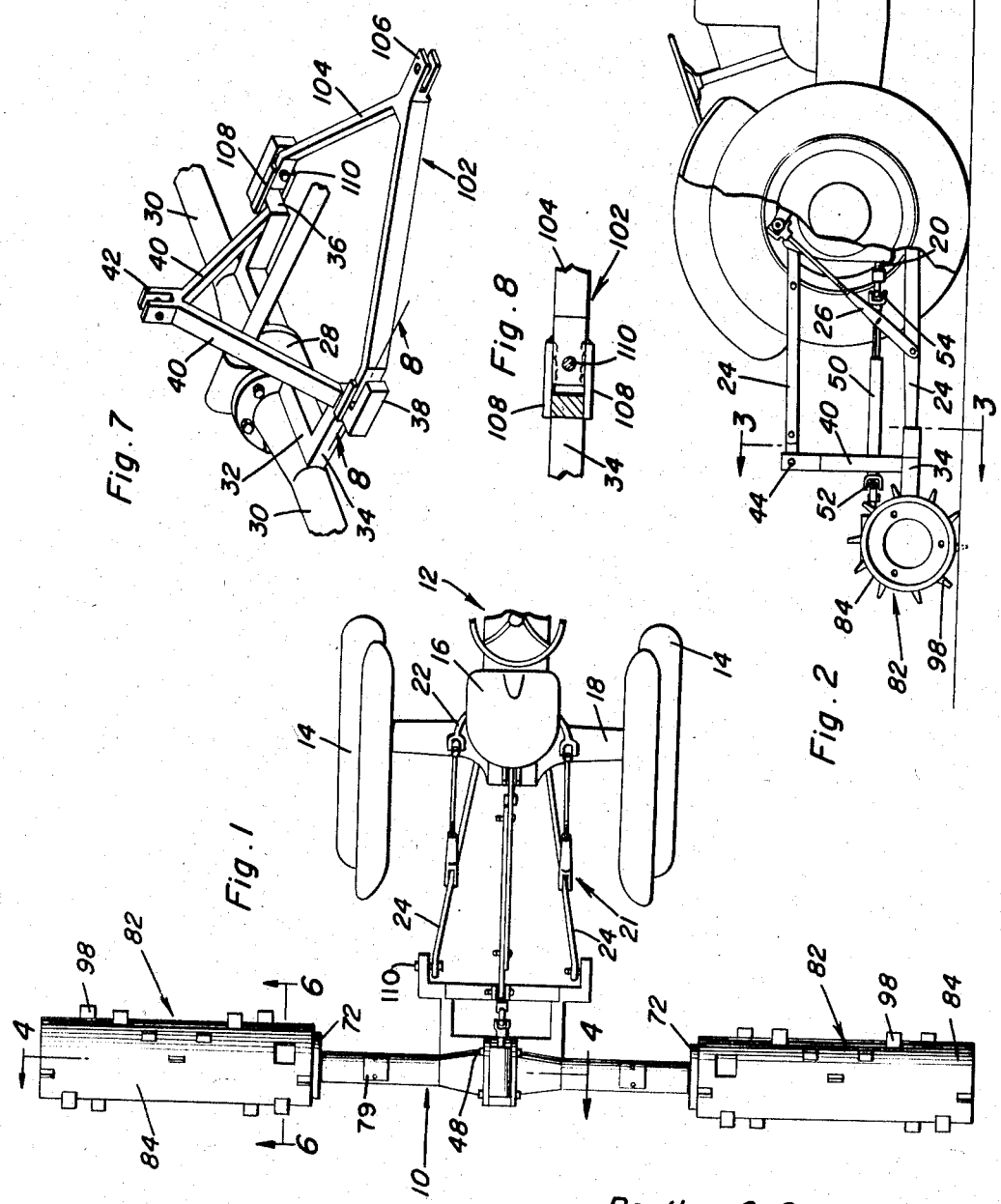
Reather C. Surratt
INVENTOR.

Jan. 13, 1959
R. C. SURRATT
2,868,305
POWER TILLER FOR ORCHARDS
Filed Feb. 13, 1957
2 Sheets-Sheet 2
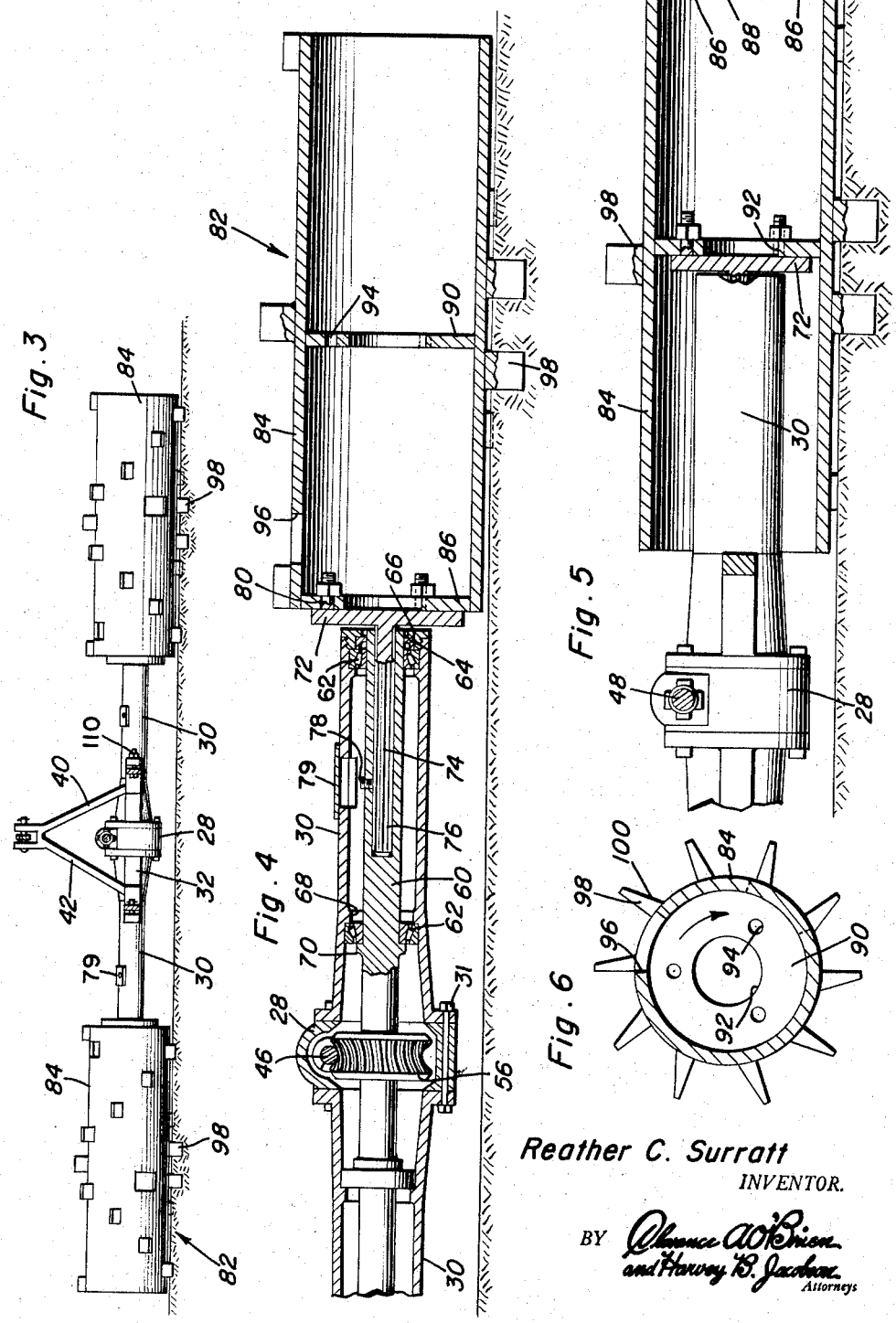
Reather C. Surratt
INVENTOR.

United States Patent Office 2,868,305
Patented Jan. 13, 1959

2,868,305

POWER TILLER FOR ORCHARDS

Reather C. Surratt, Denton, N. C.

Application February 13, 1957, Serial No. 639,987

5 Claims. (Cl. 172—47)

The present invention generally relates to a cultivating device and more particularly relates to a tiller especially adapted for use in conjunction with orchards in cultivating the soil adjacent to tree trunks when the tree limbs are hanging downwardly in closely spaced relation to the ground such as would prevent the passing of a tractor thereunder with the present invention incorporating a laterally extending tilling element driven from the power take-off for cultivating this normally inaccessible area with the laterally extending cultivating element or elements being reversible for positioning rearwardly of a tractor for use as a pulverizer thereby providing a cultivating assembly adaptable for various purposes by reorientating the structure thereof.

An object of the present invention is to provide a tilling device especially adapted for use in conjunction with cultivating orchards having a hitch assembly adapted to be supported from a conventional three-point lift hitch employed on present day tractors together with an adapter which adapts the device to be attached to tractors having a conventional drawbar or an old style lift arm.

A further object of the present invention is to provide a cultivating device having a pair of laterally extending cultivator elements in the form of cylindrical drums having a plurality of radially extending teeth thereon with the teeth being arranged so that only two teeth are in engagement with the soil at any one time thereby reducing the driving force required for rotating the drums.

Yet another object of the present invention is to provide a cultivating device having a cultivating tool in the form of a rotatable drum having a plurality of radially extending teeth therein with the forward surface of the teeth being inclined away from the direction of rotation whereby the teeth will be self-cleaning and will not pick up grass, roots and other debris while cultivating.

Other objects of the present invention will reside in its simplicity of construction, adaptation for various cultivating operations, ease of attachment, ease of control, efficiency of operation, adaptation for use with various types of tractors and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the tiller for orchards of the present invention illustrating both tilling units or cultivating tools in position for extending laterally of the path of movement of the tractor for cultivating the area immediately under the orchard trees;

Figure 2 is a side elevational view of the construction of Figure 1 with a portion of the tractor being broken away for illustrating the connection of the device to the three-point lift of the tractor;

Figure 3 is a transverse sectional view taken substantially upon a plane passing along section line 3—3 of Figure 2 illustrating the orientation of the cultivating units and the housing for the power axles therefor;

Figure 4 is a longitudinal, vertical sectional view taken substantially upon a plane passing along section line 4—4 of Figure 1 illustrating the details of construction of the drive mechanism and the means of attaching the cultivating elements;

Figure 5 is a sectional view somewhat similar to Figure 4 but showing the cultivating elements in reversed position with the inner end thereof overlying a portion of the housing whereby the cultivating elements will be disposed directly rearwardly of the tractor;

Figure 6 is a transverse, vertical sectional view taken substantially upon a plane passing along section line 6—6 of Figure 1 illustrating the details of construction of the tiller or cultivating elements;

Figure 7 is a partial perspective view illustrating an adapter for the hitch for the cultivating assembly for attachment of the assembly to a tractor having a conventional drawbar construction; and Figure 8 is a detailed sectional view taken substantially upon a plane passing along section line 8—8 of Figure 7 illustrating the details of construction of the attaching means for the adapter.

Referring now specifically to the drawings, the numeral 10 generally designates the tiller of the present invention for attachment to a farm tractor generally designated by the numeral 12 which includes the usual rear driving wheels 14, operator's seat 16, rear axle housing 18, rearwardly extending power take-off shaft 20, and a three-point hitch assembly generally designated by numeral 21 which includes the usual pair of lift arms 22, three rearwardly extending arms 24, and interconnecting arms 26 extending between the lift arms and the lower two arms 24.

The tiller 10 includes a centrally disposed gear casing 28 with a pair of outwardly extending axle housings 30 secured thereto by fastening bolts 31. The inner portion of each of the axle housings 30 is provided with a bracket 32 having a forwardly projecting outer end 34 which terminates in an offset portion 36 and a second forwardly extending portion 38. Upstanding from the forward ends of the first forwardly extending portion 34 is a pair of converging arms 40 terminating at their apex in a pair of upstanding lugs 42 for pivotally receiving the rear end of the upper of the rearwardly extending arms 24 with the arm 24 being attached thereto by a transverse pin 44.

Journaled in the gear case 28 is a worm gear 46 having a forwardly extending input shaft 48 connected thereto. The input shaft 48 is connected to a telescopic drive shaft 50 through a universal joint 52. The forward end of the telescopic drive shaft 50 is connected to the power take-off 20 of the tractor 12 by a similar universal joint 54 thus providing a driving force for the worm gear 46.

The worm gear 46 is in meshing engagement with an enlarged worm pinion gear 56 having laterally extending shaft 60 rigid therewith with the shaft 60 extending from both sides of the gear 56 and being journaled in the axle housing 30 by longitudinally spaced roller bearing assemblies 62. The outer end of the axle housing 30 is provided with a grease seal 64 and a removable retainer cap 66 for permitting replacement of the grease seal 64. The bearing assemblies 62 may be retained between inwardly extending shoulders 68 on the housing 30 and flanges 70 on the shaft 60 for the inner bearing 62 and the retaining nut 66 for the outer bearing 62.

A circular mounting plate 72 is provided with an inwardly extending splined axle 74 telescopically received in a longitudinally elongated splined socket 76 in the shaft 60 for rotatably supporting the plate 72 and for transmitting driving force thereto. A removable set-screw 78 accessible through removable plate 79 is provided for locking the splined axle 74 in the socket 76 and permitting removal thereof for replacement of any of the parts as may be required.

The mounting plate 72 is provided with a plurality of outwardly extending studs or fastening bolts 80 for detachably mounting a cultivating tool assembly generally designated by numeral 82.

The cultivator tool assembly 82 includes a generally cylindrical drum 84 having an end plate 86 with an enlarged central aperture 88 and a plurality of small apertures 86 for receiving the fastening studs whereby the cultivator tool assembly 82 may be mounted on the mounting plate 72 with the drum 84 projecting outwardly therefrom. The drum 84 is provided with an inwardly disposed mounting plate 90 inwardly of the end plate 86 with the plate 90 also having an enlarged central aperture 92 and a plurality of smaller spaced apertures 94 for receiving the fastening studs 80 when the cultivator tool assembly 82 is reversed after it has been disconnected with the outer end of the drum 84 then extending inwardly into overlying relation to the axle housing 30. The first position of the drum 84 is shown in Figure 4 when the mounting plate is connected to the end plate 86 and the second position is shown in Figure 5 when the mounting plate 72 is connected to the inner head or plate 90. The periphery of the drum 84 is provided with at least one enlarged opening 96 for providing access to the inner surfaces of the plates 86 and 90 for facilitating the manipulation of the fastening studs or bolts and specifically the nuts thereon. The enlarged openings 88 and 92 in the plates 86 and 90 respectively permit an elongated wrench to be inserted from the end of the drum 84 for rigidly tightening the nuts on the fastening studs 80 thereby rigidly securing the drum 84 to the mounting plate 72. It is pointed out that the space bearing assembly 62 as well as the elongated splined connection between the axle 74 on the shaft 60 provides the rigid rotational support for the cultivator assembly 82 so that the assembly 82 will be easily movable with the housing 30 and be driven with a minimum of rotational force.

Rigidly secured to the outer surface of the drum 84 is a plurality of radially projecting teeth 98 having the surface thereof facing the direction of rotation being tapered or inclined away from the direction of rotation with the surface being designated by the numeral 100. This incline to the teeth 98 will prevent the entangling of grass, roots or the like on the teeth 98 when the drum 84 is being driven and will also provide a self-cleaning feature since the grass will be urged outwardly along the inclined surface 100 thus providing a self-cleaning cultivator unit. Also, the teeth 98 are arranged in such a manner that only two of the teeth are engaged with the ground surface at any one time as shown in Figures 4 and 5 thus reducing the force required for rotating the drum 84. Also, the speed of the drum 84 is such that the teeth travelling in the same path of movement on the drum will engage each increment of soil without any portion of the soil being engaged twice and without any portion of the soil being undisturbed thereby assuring complete cultivation of the soil.

Figure 7 illustrates an adapter generally designated by numeral 102 including a pair of forwardly converging arms 104 terminating at its apex in a pair of forwardly projecting lugs 106 for attachment to the conventional drawbar of a tractor which is generally stationary. The rear ends of the arms 104 are each provided with a pair of rearwardly projecting plates 108 underlying and overlying the offset portion 36 of the brackets 32 thus preventing relative pivotal movement between the adapter 102 and the bracket 32. The rearwardly extending ends of the arms 104 are positioned over inwardly extending pins 110 on the forwardly extending portions 38 which are the same pins as secures the lower of the two arms 24 to the portions 38. One of the pins 110 is removable as shown in Figure 3 to permit the assembly of the adapter to the bracket hitch 32.

It is pointed out that the details of the drive mechanism including the gear transfer mechanism and the shaft and axle arrangement and the specific bearing assemblies may be altered as deemed desirable by the manufacturer without changing the invention since the various bearings, seals and orientations of these drive elements may be altered for each individual installation.

With the tiller orientated as shown in Figure 1, the soil adjacent to and under the trees of an orchard may be easily cultivated by a person operating the tractor. With the device orientated as shown in Figure 5, the device may be used as a power tiller and it is also pointed out that either or both of the cultivating tool assemblies 82 may be employed either under power or without power. When the device is operating without power, it will act as a pulverizer being pulled directly behind the tractor such as is illustrated in Figure 5.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tiller for use in cultivating orchards or the like comprising a hitch assembly for attachment to a towing vehicle, a transversely extending hollow housing mounted on said hitch assembly, an axle rotatably journaled in said housing, a mounting plate rigid with the outer end of said axle, a cultivator tool unit detachably secured to the mounting plate, said tool unit including a cylindrical drum, a plurality of radially projecting teeth rigid with the periphery of said drum, an end plate in one end of said drum for attachment to the mounting plate whereby the drum will be disposed laterally outwardly of the housing and extending laterally of the path of movement of the towing vehicle, and an inner plate in the drum disposed in spaced relation to the end plate for attachment to the mounting plate when the drum is reversed with the open end thereof telescoping over the housing thereby disposing the drum behind the towing vehicle.

2. The combination of claim 1 wherein each of said teeth is provided with an inclined face slanting away from the direction of rotation thereby urging foreign material outwardly thereof for maintaining the teeth free of foreign material.

3. The combination of claim 1 wherein said housing includes a power transfer gear assembly including a pinion gear adapted to be driven from a power take-off from the towing vehicle, means operatively connecting said pinion gear with the axle for rotating the mounting plate and tool unit.

4. The combination of claim 1 wherein said hitch assembly includes a pair of forwardly projecting brackets having a pair of inwardly extending pins on the forward ends thereof for engagement with a conventional three-point lift hitch on a towing farm tractor.

5. The combination of claim 4 wherein at least one of said pins is removable, and an adapter for interconnecting the hitch assembly with a conventional drawbar on a farm tractor, said hitch assembly including a laterally offset portion in the forwardly extending brackets, said adapter including a pair of rearwardly extending legs having apertures receiving the pins, the terminal ends of the legs having projecting vertically spaced plates closely overlying and underlying the adjacent offset portions for preventing relative pivotal movement between the hitch assembly and adapter.

References Cited in the file of this patent

UNITED STATES PATENTS

| | | |
|---|---|---|
| 2,176,984 | Adkinson | Oct. 24, 1939 |
| 2,279,652 | Beard | Apr. 14, 1942 |
| 2,748,679 | Rogers | June 5, 1956 |